US 11,526,367 B1

(12) United States Patent
Nair et al.

(10) Patent No.: US 11,526,367 B1
(45) Date of Patent: Dec. 13, 2022

(54) SYSTEMS AND METHODS FOR TRANSLATION OF A DIGITAL DOCUMENT TO AN EQUIVALENT INTERACTIVE USER INTERFACE

(71) Applicant: Morgan Stanley Services Group Inc., New York, NY (US)

(72) Inventors: Arun Nair, Hoboken, NJ (US); Anand Verma, Bangalore (IN); Tushar Agarwal, Bahraich (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 17/327,292

(22) Filed: May 21, 2021

(51) Int. Cl.
  *G06F 17/00* (2019.01)
  *G06F 9/451* (2018.01)
  *G06Q 10/10* (2012.01)
  *G06F 40/197* (2020.01)
  *G06F 40/186* (2020.01)
  *G06F 3/0486* (2013.01)

(52) U.S. Cl.
  CPC ........... *G06F 9/451* (2018.02); *G06F 3/0486* (2013.01); *G06F 40/186* (2020.01); *G06F 40/197* (2020.01); *G06Q 10/10* (2013.01)

(58) Field of Classification Search
  CPC ...... G06F 9/451; G06F 40/186; G06F 40/197; G06F 3/0486; G06Q 10/10
  USPC ....................................................... 715/762
  See application file for complete search history.

(56) References Cited

U.S. PATENT DOCUMENTS

| 10,970,477 | B1* | 4/2021 | Mohapatra | G06F 40/186 |
| 2006/0052884 | A1* | 3/2006 | Staples | G06F 8/38 700/83 |
| 2013/0318426 | A1* | 11/2013 | Shu | G06V 30/416 715/226 |
| 2014/0095968 | A1 | 4/2014 | Harrop | |
| 2018/0143975 | A1 | 5/2018 | Casal et al. | |
| 2019/0369857 | A1* | 12/2019 | Thomas | G06F 3/04842 |
| 2020/0019589 | A1 | 1/2020 | Dykema | |
| 2020/0057994 | A1 | 2/2020 | Hunn | |
| 2020/0210490 | A1* | 7/2020 | Hutchins | G06F 40/20 |
| 2020/0341903 | A1* | 10/2020 | Dobiesz | G06F 9/541 |

* cited by examiner

*Primary Examiner* — Jason T Edwards
(74) *Attorney, Agent, or Firm* — Pearl Cohen Zedek Latzer Baratz LLP

(57) ABSTRACT

Systems and methods for translation of a digital document to an equivalent interactive User Interface (UI), receive the digital document containing content; detect a selection and placement of a plurality of form fields, based at least in part on the content; construct a UI template and corresponding object graph, based at least in part on the selection and placement of each of the plurality of form fields; wherein the UI template represents the content of the digital document according to a predefined document schema; and wherein the object graph is defined by one or more dependencies and one or more validations associated with the selection and placement of each of the plurality of form fields; parse the UI template; and render the UI template as an interactive UI for distribution to an end user based at least in part on a predefined rendering library.

20 Claims, 9 Drawing Sheets

```
{
    "documentTypeDisplayName": "Generic User Document",
    "documentHeader": null,
    "documentName": "Document 1",
    "lastEditableSectionId": 1,
    "summaryLabel": null,
    "sections": [
        {
            "sectionId": 1,
            "sectionName": "disc1",
            "sectionShortDescription": "",
            "sectionLabel": "General Section",
            "sectionStatus": "In Progress",
            "subSections": [
                {
                    "subSectionName": "disc1sb1",
                    "subSectionCompleted": "false",
                    "subSectionStatus": null,
                    "subSectionLabel": "SubSection 1",
                    "componentAlignment": null,
                    "components": [
                        {
                            "componentName": "disc1sb1c1",
                            "componentType": "form",
                            "componentLabel": null,
                            "hidden": false,
                            "fields": [
                                {
                                    "fieldName": "disc1sb1c1f1",
                                    "fieldType": "Input",
                                    "placeHolder": "Please enter",
                                    "hidden": false,
                                    "isFieldMandatory": false,
                                    "fieldLabel": "Field Input Label",
                                    "selectedValue": null,
                                    "fieldDependencies": null,
                                    "width": 100,
                                    "labelWidth": 50
                                }
                            ]
                        }
                    ]
                }
            ]
        }
    ]
}
```

FIG. 5

```
export interface IFormBuilder {
    document: Partial<IDocumentData>;
    sections: { [key: string]: Partial<ISection> };
    subSections: { [key: string]: Partial<ISubSection> };
    components: { [key: string]: Partial<IComponent> };
    fields: { [key: string]: IField };
    fieldDependencies: { [key: string]: Dependency[] };
    dataDependencies: { [key: string]: Dependency[] };
    parentDependencies: object;
    selectedSection: string;
    selectedSubSection: string;
    selectedComponent: string;
    selectedField: string;
    activeElement: 'section' | 'subSection' | 'widget' | 'field';
    dependencyMode: boolean;
    tempDependents: Array<IFieldDependency>;
    updatedItem: string;
}
```

ABC LONG FUND III LTD.

INVESTOR PROFILE FORM

PLEASE COMPLETE ALL APPROPRIATE ITEMS. ①

(A) INVESTMENT AMOUNT

*(Please complete (i), (ii) or (iii) below as applicable)*

(i) For subscriptions – please indicate the class and amount to be invested:

Class J Shares ☐ US$ _____
(1.5% / 20%, 12 month lock-up) (Subscription Amount)

Class K Shares ☐ US$ _____
(1.5% / 17.5%, 36 month lock-up) (Subscription Amount)

②

(ii) For transfers or class conversions – please check below. The class and amount of the Investor's investment will be as set forth in the applicable transfer or class conversion documents. ☐

(iii) In all other instances – please check below. The Investor is completing these subscription documents at the Management Company's request, and not in connection with any subscription, transfer or conversion. ☐

If this (iii) applies, the class and amount of the Investor's investment will remain unchanged. Furthermore, references herein to "subscriptions" or "purchases" should be read to refer to the maintenance of the Investor's existing investment.

(B) NAME OF INVESTOR

*(Please provide the name of the Investor to be included in the books and records of the Fund. See instructions below regarding "Determination of Agent / Beneficial Owner Status" for reference.)* ③

FIG. 8A

SYSTEMS AND METHODS FOR TRANSLATION OF A DIGITAL DOCUMENT TO AN EQUIVALENT INTERACTIVE USER INTERFACE

FIELD OF THE INVENTION

The present invention is in the field of interactive user interface design. In particular, the present invention is directed to systems and methods for translation of a digital document to an equivalent interactive User Interface (UI), comprising.

BACKGROUND OF THE INVENTION

Several business workflows including financial services are still document heavy. Managed over e-mail and faxes, these workflows have low Straight-Through-Processing (STP) rates, high maintenance overhead, and are prone to manual operational errors. Most document management systems focus on digital documents (e.g., digital representations of physical documents) such as Word (e.g., .doc, .docx, etc.) or Portable Document Format (e.g., .pdf) documents, but do not have good, repeatable, testable, standard solutions to transform such digital documents into an online experience. Furthermore, typical document management systems focus on standardization and templating that does not help scale or provide flexibility to accommodate different client demands. With rapid digital transformation across industries, end users experience is paramount and there is a need to provide them with online self-service tools with supervisory controls.

SUMMARY OF THE INVENTION

Embodiments of the invention include a method for translation of a digital document to an equivalent interactive User Interface (UI), performed on a computer having a processor, and memory; and one or more code sets stored in the memory and executing in the processor. In some embodiments, the processor receive the digital document containing content; detect a selection and placement of a plurality of form fields, based at least in part on the content; construct a UI template and corresponding object graph, based at least in part on the selection and placement of each of the plurality of form fields; in which the UI template represents the content of the digital document according to a predefined document schema; and in which the object graph is defined by one or more dependencies and one or more validations associated with the selection and placement of each of the plurality of form fields; parse the UI template; and render the UI template as an interactive UI for distribution to an end user based at least in part on a predefined rendering library.

In some embodiments, the content consists of one or more of: structure, input fields, logical grouping of fields, sequence of presentation, predefined dependencies, custom dependencies, data, reference Universal Resource Locator (URL) links, contextual help guidelines, markup, formatting, alignment, header, footer, references, visibility, validation rules, data binding with downstream/upstream systems, event handling, document completion status, and metadata of a document template of the digital document.

In some embodiments, the selection and placement of the plurality of form fields is via execution of a drag-and-drop function. In some embodiments, the predefined document schema consists of a plurality of form elements which follow a hierarchal structure and comprise one or more of each of: a section, a subsection, a component and a field.

In some embodiments, the plurality of form fields consists of at least one of: a small label, a long label, a date picker, an autocomplete, a textbox, a checkbox, a number, a text area, a checkbox option, a dropdown, or a combination thereof. In some embodiments, the combination consists of a predefined widget.

In some embodiments, the processor is further configured to: store the UI template in a storage; manage version control of the UI template; and govern workflow entitlement of the UI template. In some embodiments, processor is further configured to: query the storage based on one or more attributes of the UI template; and enable access to the UI template by a user based at least in part on at least one of the version control or the workflow entitlement of the UI template.

In some embodiments, the processor is further configured to: receive input from the end user, via the interactive UI; extract the input; and populate the input in the received digital document.

In accordance with further embodiments of the invention, a system may be provided which may implement the methods described herein according to some embodiments of the invention.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 5 shows pseudocode implementing an example document schema according to at least one embodiment of the invention;

FIG. 6 shows an example custom data structure State according to at least one embodiment of the invention;

FIG. 8A and FIG. 8B show an example digital document portion and its equivalent interactive user interface, respectively, according to at least one embodiment of the invention.

Figure 1:
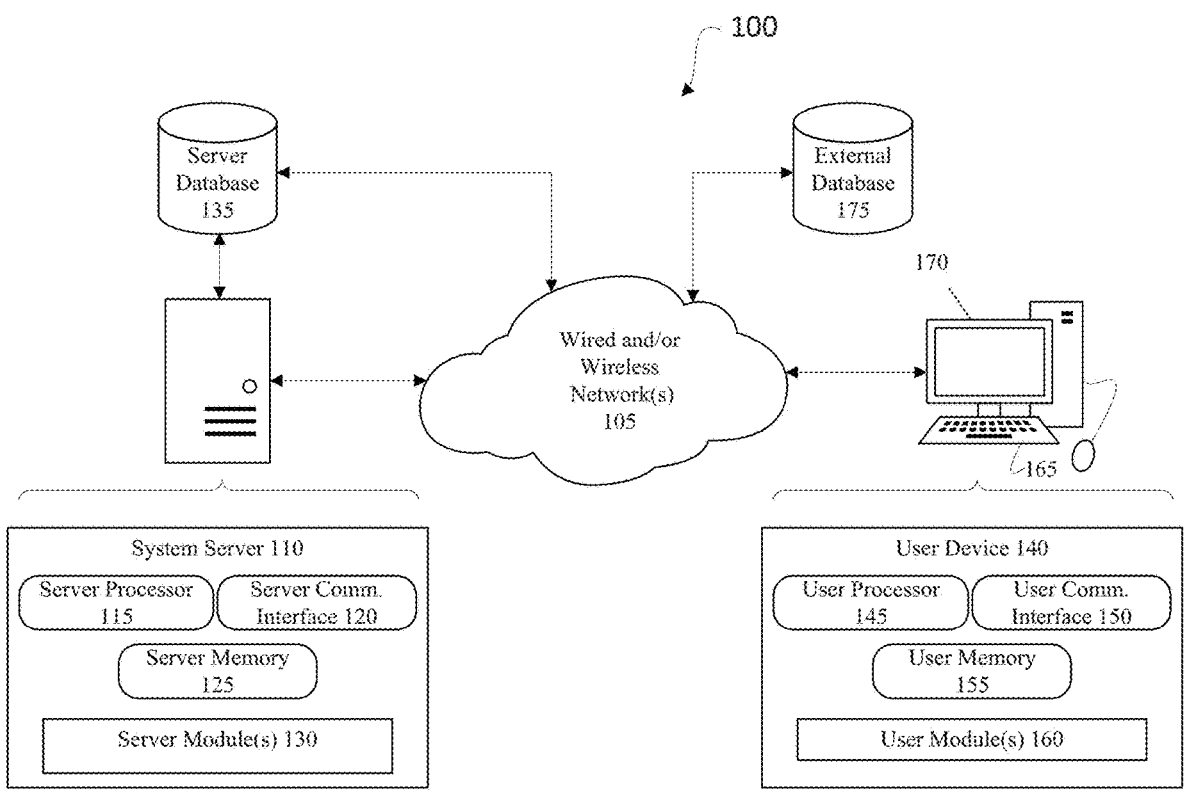
FIG. 1 shows a high level diagram illustrating an example configuration of a system for translation of a digital document to an equivalent interactive User Interface (UI), according to at least one embodiment of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Several business workflows including financial services are still document heavy. Managed over e-mail and faxes, these workflows have low Straight-Through-Processing (STP) rates, high maintenance overhead, and are prone to manual operational errors. Most document management systems focus on digital documents (e.g., digital representations of physical documents) such as Word (e.g., .doc, .docx, etc.) or Portable Document Format (e.g., .pdf) documents, but do not have good, repeatable, testable, standard solutions to transform such digital documents into an online experience. Furthermore, typical document management systems focus on standardization and templating that does not help scale or provide flexibility to accommodate different client demands. With rapid digital transformation across industries, end users experience is paramount and there is a need to provide them with online self-service tools with supervisory controls.

To address these and other challenges, embodiments of the invention provide a technology platform, referred to herein as Online Forms, which in some embodiments is configured to transform, maintain and present content originating from a physical document or digital representation of a physical document online. Embodiments of the invention may accomplish this using, three primary elements: (1) a domain-specific language referred to herein as FormDSL; (2) a designer tool referred to herein as Generic doc builder; and (3) a Generic UI Renderer (these elements are described in detail herein). The combination of these elements facilitates rapid content onboarding, e.g., to provide a secure digital experience for end users, reduce paper trail, and capture user inputs to kickoff different workflows.

Embodiments of the invention employ a domain specific language (e.g., FormDSL) which captures structure, input fields and logical grouping of fields, sequence of presentation, predefined and custom dependencies, data, reference URL links, contextual help guidelines, markup, formatting, alignment, footer and references, visibility, validation rules, data binding with downstream/upstream systems, event handling, document completion status, and metadata of the document template, as described in further detail herein. In some embodiments, the domain specific language is configured to be is generic and extensible. In some embodiments, FromDSL may internally use JavaScript object notation (JSON) as the data exchange format, and may support various formats of web-based documents and forms. In some embodiments, FormDSL may include markup for presentation styling, and establishes a structure or a schema that can be easily transformed into user interface (UI) components. Some embodiments of the invention support flexible workflows, manage versions, manage data and associated dependencies, and provide a modern online experience with robust checks and controls, as described in detail herein.

FormDSL is structured to support documents with different design, layout and styles including legal document, reports, surveys, feedback forms, etc. Accordingly, in some embodiments, systems and methods that implement FormDSL can easily and effectively parse and render documents or forms. Some of its core features may include: precise control over document or content layout and structure; content formatting and styling; form field validations and dependencies; capability to support custom field properties without any change in schema; efficient user input management; a feature to upload and maintain read-only documents for reference; pluggable service integration with various form fields; support for footnotes, header, sub-headers, tables, etc.; HTML tags as part of various form fields. These and other features may be implemented in various embodiments, as described herein.

Accordingly, embodiments of the invention provide systems and methods which transform, maintain, present and distribute content of a document online via a web-based user interface. Some embodiments involve creating an online template from an existing physical or digital document, establishing constraints and validations across different form fields of the template, implementing domain specific language (DSL) referred to here as FormDSL, and rendering a DSL template in a web-based application container with associated data and markup. Components of the systems and methods may include an online forms designer tool referred to here as Generic Doc Builder, employing a FormDSL engine, a generic form renderer library and an online forms application container.

In some embodiments, a Generic Doc Builder interface may support a corpus of system specific widgets that can be defined and/or assembled to form an object graph which, collectively, represents an online and interactive version of the document. In some embodiments, the FormDSL engine ensures that translation of the UI template to JSON follows a pre-defined ruleset. Embodiments of the systems and methods also provide document management capability wherein users can remotely collaborate and share the templates. Additional features supported, e.g., as part of a document management system, may include version management, storage, retrieval and audit of the documents and templates. In some embodiments, the system may also offer support to configure different workflows, customization and preferences.

These and other aspects of the invention are explained in further detail herein with reference to the figures.

FIG. 1 shows a high level diagram illustrating an example configuration of a system 100 for translation of a digital document to an equivalent interactive User Interface (UI), according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In some embodiments of FIG. 1, the exemplary software modules may include a communication module, and/or other modules and/or code as described herein. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 140 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
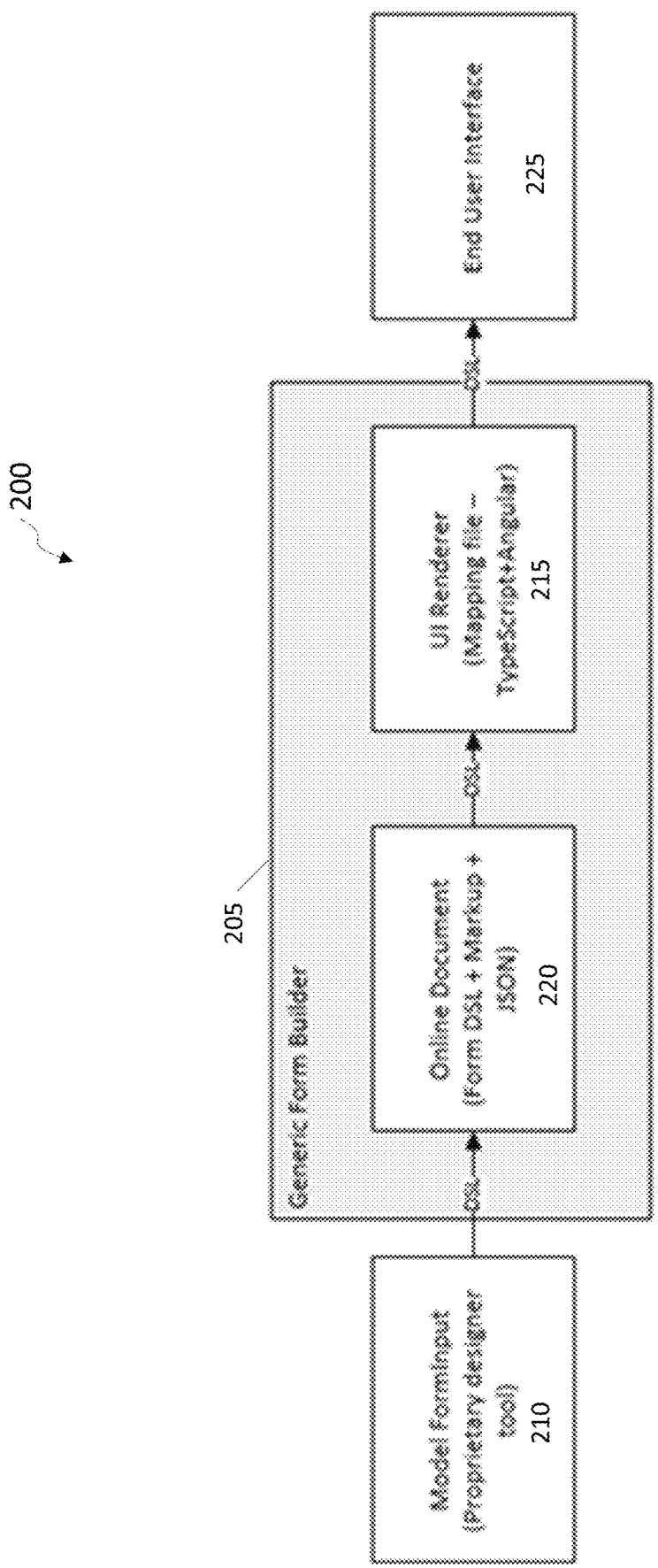
FIG. 2 is a high level block diagram showing key elements of the Online Forms technology platform according to at least one embodiment of the invention.

FIG. 2 is a high level block diagram 200 showing key elements of the Online Forms technology platform according to at least one embodiment of the invention. At a high level, in some embodiments of the invention comprise at least three key building blocks or elements: (1) Generic Doc Builder 205; (2) FormDSL 220; (2); and (3) Generic UI Renderer 215. In some embodiments, Generic Doc Builder 205 may be or may include a designer tool 210 that helps transform content from physical documents or digital documents (e.g., representing physical documents) into online document templates with features to set properties, order and group inputs, and manage dependencies. In some embodiments, Generic UI Renderer 215 may be a library that transforms the online document template into UI components in languages and standards supported by browser applications. In some embodiments, FormDSL 210 is a language that acts as a glue between the designer tool, the UI renderer, and an end user interface 225. In some embodiments, FormDSL 220 helps define the structure, object graph and/or presentation of any document content. Generic Form Builder 205 may be used (as explained herein) to create an online version of the document based on the FormDSL, Markup, and JSON.

Figure 3:
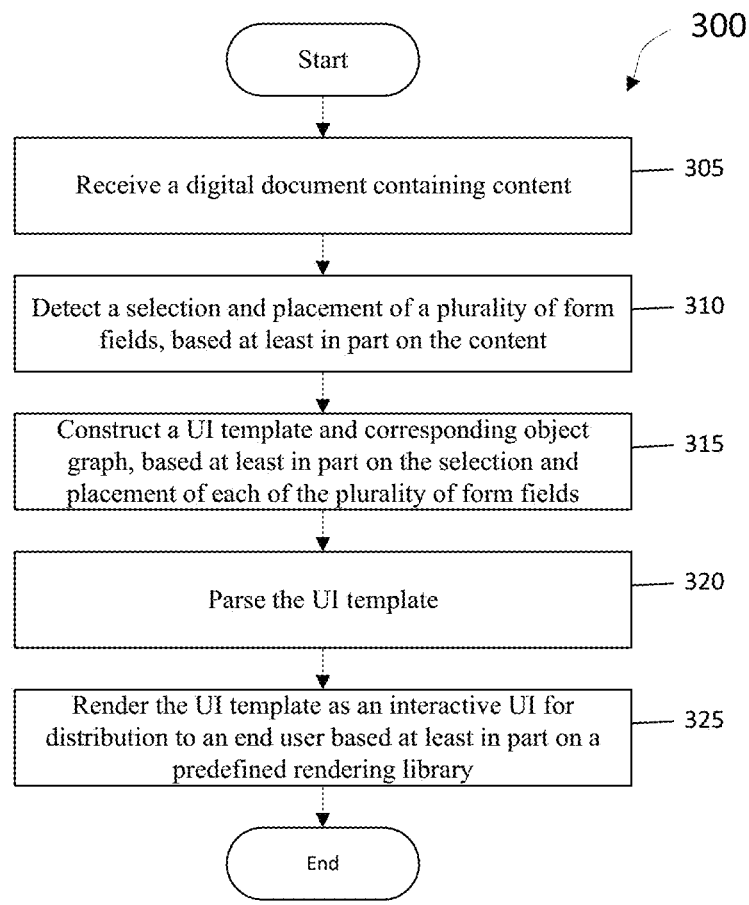
FIG. 3 is a flow diagram of a method for translation of a digital document to an equivalent interactive User Interface (UI), according to at least one embodiment of the invention.

FIG. 3 is a flow diagram of a method 300 for translation of a digital document to an equivalent interactive User Interface (UI), according to at least one embodiment of the invention. It should be noted that, in some embodiments, method 300 may be configured to implement one or more of the elements, features, and/or functions of system 100, e.g., as described in detail herein.

In some embodiments, method 300 may be performed on a computer having a processor, a memory, and one or more code sets stored in the memory and executed by the processor. In some embodiments, method 300 begins at step 305 when the processor may be configured to receive a digital document containing content. As understood herein, a digital document is a paperless representation of a document, in digital form, such as a Word or PDF document, as text in the body of an electronic communication, etc., and readable, e.g., on a display of an electronic device.

It should be noted that in some embodiments, a digital document may be initially rendered from a physical document, e.g., via a scan or fax of a physical document. In other embodiments, a document may not have originated in physical form, i.e., it may have been generating in digital form using, e.g., a word processor program on a computer. In some embodiments, a digital document may be received via the internet, e.g., via e-mail, via an internal network, e.g., retrieved from a database or attached scanner, or may be received direct from storage by the processor. In some embodiments, either before, concurrently, or after receiving the digital document, the processor may be configured to receive a selection of meta details such as, for example, business entity, the name of a client for which an online document is being created, a label (e.g., for a generic document that can be universally used), etc. In some embodiments, a number of initial sections to begin with may be received. In some embodiments, the processor may provide a default number of sections, e.g., two sections, and more can be added (or subtracted) as required.

In some embodiments, the received digital document may contain content. For example, the digital document may contain text, formatting, styling, layout and other structure information, input fields, logical grouping of fields, sequence of presentation, predefined dependencies, custom dependencies, reference Universal Resource Locator (URL) links, contextual help guidelines, markup, titles, alignment, headers, footers, sub-headers, references, tables, data, metadata, visibility, validation rules, data binding with downstream/upstream systems, event handling, document completion status, metadata of a document template of the digital document, etc. In some various embodiments, the content may represent different types of information typically found in documents such as, for example, legal documents, medical and other forms, investor documents, business prospectuses or other transaction documents or requests for information (RFI), records, etc.

At step 310, in some embodiments, the processor may be configured to detect a selection and/or placement of a plurality of form fields, e.g., based at least in part on the content of the document. In some embodiments, placement may refer to placement of a field or other element within a designated area in a user interface of the platform, for example, in a dedicated area such as a grid, window. In other embodiments, placement may refer to the organization of a field with respect to one or more other fields or elements, e.g., in a sequence or order, or based on some other hierarchical or chronological designation. For example, in some embodiments the processor may enable a user to create and/or add widgets (e.g., via execution of a drag-and-drop function, e.g., from a list of available fields) and relevant form fields from a set of pre-defined fields that correspond to the source document. Supported field types, may include, for example, Small Label, Long Label, Date picker, Autocomplete, Textbox, checkbox, number, text area, checkbox option, Dropdown, etc.

In various embodiments, a variety of different form field details may be supported. In some embodiments, each widget or form field may be configured in the Generic Doc Builder using FormDSL to a pre-formatted structure which may be interpreted by all workflow steps and components, such as the end user interface. This structure may be extensible for any feature addition. For example, a Small label form field may be used for presenting context or text that does not need any formatting and spans over single or few lines. A Label form field may be used when content requires substantial formatting. In some embodiments, when the content spans over multiple paragraphs then Label field may be preferred. A Date Picker form field may enable selection of specific date from a calendar. A dropdown form field may enable selection from a list of options. An Autocomplete form field may be similar to dropdown form field but may provide additional capability of filtering the available values based on user input. In various embodiments, FormDSL may support hardcoded values, as well as services driven values. Of course, other form fields may be supported, as understood by those skilled in the relevant art.

In some embodiments, widgets may be created from scratch and stored for future re-use. In some embodiments, different widgets may be created, e.g., by a user, or automatically generated for a specific scenario or implementation. In some embodiments, the platform may provide one or more commonly used preformed widgets such as contact card, address, etc. In some embodiments, preformed widgets may be further edited or otherwise customized, e.g., to fit specific requirements of the user.

In some embodiments building widgets and form fields through the designer tool may be manually controlled, e.g., by a design team managing documents, for example, with optimizations to reuse and clone entire documents, sections or specific components, etc. In some embodiments, building widgets and form fields through the designer tool may be implemented by the processor executing an automated extraction of content, e.g., from an existing PDF or Word document, using machine learning, optical character recognition (OCR), natural language processing (NLP), and other forms of artificial intelligence (AI), as understood by those skilled in the art. In some embodiments, the processor may be configured to connect, e.g., via one or more application programming interfaces (APIs), with one or more external systems, e.g., of institutions, etc., to transmit and receive data and associated metadata over a network to build end user snapshots of forms with filled in data for review and approval, thereby reducing manual inputs.

In some embodiments, the platform may provide for design layout and document structure control. For example, in some embodiments, layout may be controlled through relative placement of form fields in a widget, or through relative placement of form fields and/or widgets in a grid. Various form field properties like width, labelWidth, isNewLine, etc., may control the layout of the form field. In some embodiments, a user can drag and drop or otherwise move or reorganize widgets and fields in the sections and/or subsections. In some embodiments, all form fields may be part of some widget.

At step 315, in some embodiments, the processor may be configured to construct a UI template and corresponding object graph, based at least in part on the selection and placement of each of the plurality of form fields. In some embodiments, the UI template may represent the content of the digital document according to a predefined document schema, e.g., a schema as defined in the FormDSL.

Figure 4:
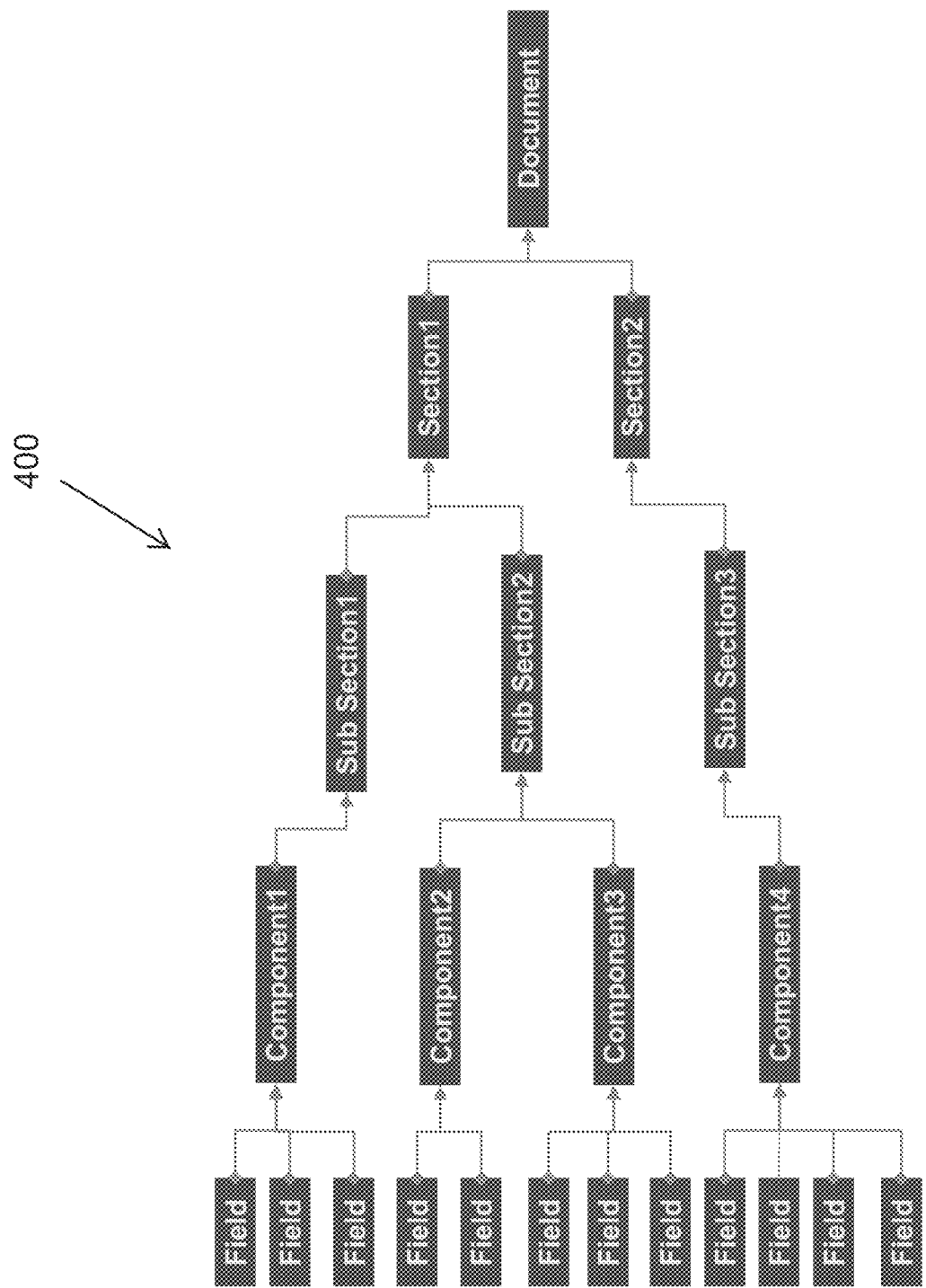
FIG. 4 show an example document schema implemented by the FormDSL according to at least one embodiment of the invention.

Turning briefly to FIG. 4, an example document schema implemented by the FormDSL is shown according to at least one embodiment of the invention. In some embodiments, FormDSL may use a structure or a schema to represent the document. In some embodiments, the schema may follow a hierarchal structure in which Document is a top-level wrapper that encapsulates metadata information such as document name, business entity details, maker-checker rules, audit, a list of sections, etc. The hierarchal structure of the schema aligns well with often used document layouts in many domains, e.g., business, etc. The parent and child relationship supported by this hierarchal structure is instrumental in supporting visual grouping as well as functional features. In some embodiments, the core building blocks of the FormDSL document schema include sections, sub-sections, components and fields, as represented in FIG. 4.

Sections, as understood herein, may segregate a whole document/template into multiple segments or pages, and/or may group the relevant information like a chapter in a book. In some embodiments, sections may act as container for a group of sub-sections and provide structure to the document. In some embodiments, sections may provide the theme of underlying content through section headers and sub-headers. In some embodiments, FormDSL may support such workflow features as unless all the child subsections of a given section are completed (e.g., filled with data) by the user, the section cannot be marked as completed.

Sub-sections, as understood herein, may contain a group of components. In some embodiments, sub-sections may be more analogous to sub-topics in a chapter. Sub-sections may also support footnotes or guidelines. In some embodiments, footnotes may be maintained at sub-section level as users can view only one sub-section at a time and other sub-sections are collapsed. In some embodiments, sub-sections also have properties that maintain information about the status of each sub-section, e.g., whether the user visited the given sub-section and has the user filled all mandatory form fields in the subsection.

Components, as understood herein, may be comprised of one of two types: table and form. In some embodiments, components are primarily used for grouping of fields and defining dependencies from a parent field to a group of fields in a component. A primary difference between Table and Form components is how they control the layout in the UI template.

In some embodiments, the Table component may be used when content is to be presented in grid or table form. The information may be structured in rows and columns, and headers of the table define the values in each cell of the table. In some embodiments, tables may support a download feature, in which a user can download any PDF attachment. In such embodiments, the user may control the number of columns and rows through table specific properties.

In some embodiments, the Form component may be used for any other layout or structure of the document (besides for Table). In some embodiments, users may have precise control over alignments, spacing, indentation, etc. In the form component, all the form fields may be placed next to each other. In some embodiments, the default width of each form field may be, for example, 50% of the total width of the widget. In some embodiments, total width may vary based on screen size but a default may be 50% of actual screen size. In some embodiments, width of form fields may be modified to accommodate more or fewer fields in a row. Ins some embodiments, form fields may automatically flow to a next line if the cumulative width of all fields in a row is more than 100%.

In some embodiments, Form field is the entity that captures user inputs or presents some content to the user. In various embodiments, some form fields may be static and used for presenting content, e.g., Label, while others may be dynamic fields and used for capturing user inputs or some information, e.g., Date picker, dropdowns, etc. In some embodiments, form fields are generally supported by Javascript, but Generic Doc builder may also support custom fields which are use-case specific. In some embodiments, each form field may have a unique behavior and/or look. In some embodiments, relevant form field may be selected by the user to capture input in a correct format, e.g., Date Picker for selecting dates. In some embodiments, Generic Doc builder may support multiple form fields and all the form fields may be part of some widget.

In some embodiments, Form field properties may control behavior, appearance, supported user inputs, content, etc. User Inputs may be captured and stored, e.g., in selectedValue property of each field. Most fields typically share the same or similar set of properties including selectedValue, fieldName, width, labelWidth. In various embodiments, fields may have field specific properties as well, e.g., autocomplete form field has dataURL property. Behavioral properties may include, for example, isFieldMandatory—this property ensures that unless the user inputs some value in the field, the field may be identified as incomplete. In some embodiments, one or more behavioral properties may apply necessary business rule validations to help ensure data is complete, accurate and/or with proper documentation support, where needed.

In some embodiments, a Field Dependencies feature may help define parent-child relationships between unrelated fields and components. The behavior and layout of a child field or component may be controlled, e.g., based on any user action on a parent field or component. In some embodiments, dependencies may be defined in a fieldDependencies property of a field. Parameters that drive dependency may be, for example, dependentEntityId, dependentEntityType, and dependencyCondition, in which dependentEntityId is the unique identifier of child field or component, dependentEntityType describes whether the dependent entity is a field or component, and dependencyCondition is an expected behavior on a user action.

Turning briefly to FIG. 5, pseudocode implementing an example document schema 500 is shown according to at least one embodiment of the invention. In some embodiments, document schema 500 may provide a hierarchy including document information, sections, sub-sections, components, fields, field properties and dependencies, and support visual grouping as well as functional features, etc., as described herein.

Returning to FIG. 3, in computer science, in an object-oriented program, groups of objects form a network through their relationships with each other, either through a direct reference to another object or through a chain of intermediate references. In some embodiments, these groups of objects may be referred to as object graphs. Accordingly, in some embodiments, the processor may be configured to construct a UI template and corresponding object graph based at least in part on the selection of relevant form fields and widgets from a set of pre-defined UI form fields and widgets, e.g., supported by the generic doc builder. In some embodiments, the processor may be further configured to add one or more validations and/or one or more dependencies. In some embodiments, validations ensure that user inputs are validated based on rules defined as part of validation. In some embodiments, dependencies control the value(s) of any form field or change Document Object Model (DOM) structure based on user action on some other form field in the template. In various embodiments, validations and dependencies may be user-defined or automatic.

In some embodiments, when constructing the UI template, the processor may be configured to bind the input fields to any internal systems or Application Protocol Interfaces (APIs) that may be required to exchange data with the UI template and/or define the type of data exchange format. In some embodiments, FormDSL binds each widget and arranges the various widgets and form fields into a structure that can be interpreted and rendered by end user interface.

In some embodiments, the processor may be configured to save the template, e.g., in a storage or on a web server, to ensure that data is not lost and to ensure that other entitled users can collaborate on this template. In some embodiments, the processor may be configured to manage version control of the UI template. In some embodiments, multiple users cannot edit the template at the same time, e.g., there may be a logic to ensure users know who is working on a version and a lock may be released after a predefined number of minutes of inactivity. In some embodiments, the processor may be configured to govern workflow entitlement of the UI template.

For example, in some embodiments, the processor may be configured to provide entitlement capabilities, as described herein. Entitlement support is an identity governance feature which ensures that unauthorized users cannot access or modify the document. In some embodiments, entitlements may be driven by roles and actions. For example, users may be granted roles that authorize them to perform a set of actions. Example actions that may be supported by this system in accordance with various embodiments include, but are not limited to, Enter, View, and Authorize. In some embodiments, administrators are only provided View action, so that they can review the current status of client documents but cannot amend that. In some embodiments, clients are provided enter entitlement as well, so that they can fill in forms and submit the document, as described herein.

In some embodiments, the processor may be configured to provide version management. For example, in some embodiments, each time the user saves the template, a snapshot of the template may be maintained in a datastore, e.g., in a binary format. The user may access any saved version from a landing page. In some embodiments, a user may be able to compare older versions of a template with a current version by using a preview feature. In some embodiments, a compare feature may highlight fields/components that differ between different versions. In some embodiments, a User ID, timestamp, version number, template ID, changes in the template, and/or other details may be stored, e.g., in an audit table.

In some embodiments, an audit of every user action may be maintained, e.g., on the web server. For example, DOCUMENT_REPOSITORY_HISTORY may maintain timestamp, user identity, template ID, version number, and other details. In some embodiments, every time a user clicks on a Next button in the document, the UI application may trigger a backend service call to save the document with updated user inputs. The audit information may be fetched from this database table and users/clients may check the audit from an Agreements summary page.

In some embodiments, a Generic Doc Builder library may be provided which supports a custom data structure referred to herein as "State." In some embodiments, the processor may be configured to employ this data structure to track details of all the form elements (section/subsection/component/field) used in the current template. In some embodiments, all or designated template changes may be maintained in the State. State may also maintain all or designated relevant information, including, for example, parent-child relationships between different form elements, relative position of form elements, properties of each form element, dependencies, etc. In some embodiments, any action (update, delete or insert) may be immediately updated in the State. In some embodiments, other and/or additional features may be provided, such as, for example, "Search & Replace," Spell Check, Favorites, managing dependencies on form inputs or their properties in bulk, merging multiple sections from different templates into one document, etc. In various embodiments, one or more of these features may be tracked in the State.

In some embodiments, each form element may be assigned a unique identifier, e.g., a 10-character alphanumeric identifier. This unique identifier may help in maintaining the state of the document after any update. In some embodiments, each of the unique identifiers, across the document, may be maintained in an array, for example, "randomIds." Accordingly, as new form elements are instantiated (e.g., upon dragged by the user from a side panel list to the core grid in the user interface), the generated unique identifier may be added to the array. In some embodiments a Unique identifier generator service may search the "randomIds" array to ensure that the generated identifier is not shared between different elements.

In some embodiments, each form element may maintain a list of unique identifiers (fieldName, componentName, etc.) of its direct children (e.g., within the schema). In some embodiments, the parent element may not maintain complete child objects but instead only stores unique identifiers, which would otherwise have a significant performance impact. By storing the identifiers instead of the objects, embodiments of the invention reduce storage requirements and improve processing efficiency and timing. In some embodiments, the ordering of the child identifier in the list enables the processor to determine the order in which elements are rendered on the UI.

In some embodiments, each form element of the same type, e.g., component, may be grouped in a HashMap with their unique identifier as the key in the Map. In some embodiments, a given value in the HashMap may be the list of form elements of the same type. Accordingly, in some embodiments, when a parent field needs to reference or find its child element, it may use the unique identifier that it is holding locally to find that form element from the HashMap. Similarly, in some embodiments, dependencies may be maintained at field level in the State. For example, a parent field, which controls the dependent fields, may maintain the list of dependencies. The dependency may include, for example, type of dependency (e.g. HIDE), type of target field/component, ID or name of the target field, etc., which follows the Dependency model defined in the State.

Turning briefly to FIG. 6, an example custom data structure State 600 is shown according to at least one embodiment of the invention. In some embodiments, each form element may have a set of one or more properties which define its behavior, e.g., width property for width of a given UI element, fieldLabel property for text of any field, etc. Once a field or widget is dragged from the source panel (e.g., on the left side of the platform user interface) to the subsection grid, in some embodiments a new angular field may be generated, e.g., with all the associated properties including fieldname (which uniquely identifies a field), default width, default CSS, relative position in the grid, etc. This field may be added to the existing State that is already maintained, e.g., by an application or framework such as Angular. In some embodiments, the unique identifier of this field may be added to the list of the child identifiers of its parent subsection. Based on the selected element, in some embodiments, relevant properties may be selected and updated in the JSON, as explained herein.

In some embodiments, every form element may have a parent and follow the hierarchy that is shared in detail. When a form element is instantiated, e.g., added to the core grid from the left panel by a user, in some embodiments the processor may add the element to the list that maintains all the elements of that specific type. In some embodiments, the unique identifier of this element may be added to the list in the parent field. As such, in various embodiments, the Doc builder may handle complicated form structures and support multiple nested level of data concurrently.

Returning to FIG. 3, as discussed herein, in some embodiments, each form element may be maintained in the State. To save this UI template, e.g., in the database, in some embodiments, the processor may implement the Generic Doc Builder to convert the interface into relevant JavaScript Object Notation (JSON), a lightweight data-interchange format that is generally considered easy for humans to read and write and easy for machines to parse and generate. In some embodiments, the JSON schema may be followed, as discussed herein in detail.

At step 320, in some embodiments, Generic Doc builder may translate the UI template into JSON, e.g., by parsing the State of the UI template. In some embodiments, the processor may be configured to add relevant properties. Properties for each form element differ based on form element type and are configured in a constants file. Based on the type of form element encountered in the State, in some embodiments, the processor may implement Generic Doc Builder to fetch a list of properties from the constants file and add the properties to the JSON structure.

In some embodiments, Generic Doc Builder may include logic built in to destructure a JSON schema and covert the elements of the schema into key value pair and entity arrays which can be easily updated based on user activity. Once the data is saved and/or when user activity is completed, in some embodiments, the Generic Doc Builder may be configured to again restructure the JSON schema and save it, e.g., in the underlying datastore.

In some embodiments, in order to parse the UI template, the processor may be configured to implement parsing logic. Parsing may begin with selecting the first section from the group of sections. In some embodiments the order in which the sections are stored in the Section array may be instructive. Relevant properties of the section may be added to the JSON, followed by all the subsections that are direct children of this section, each of which are fetched and iterated. In some embodiments, the sub-sections may be sequentially added to the JSON, in the same order. For the currently selected sub-section, in some embodiments, all the components of that sub-section may be fetched. In some embodiments, the processor may then iterate the parsing over each component. Each component may then be checked for all child fields. In various embodiments, each field may have different properties, e.g., based on type of field. In some embodiments, all the fields, components and sub-sections may be added to the JSON before iterating to the next section. Finally, in some embodiments, all dependencies may be translated into JSON. While each field is parsed, the list of dependencies in that field may be iterated and added to the JSON.

At step 325, in some embodiments, the processor may be configured to render the UI template as an interactive UI for distribution to an end user. The rending may be based at least in part on a predefined rendering library, as described herein. In some embodiments, the processor may be configured to implement the Generic UI Renderer, which is a library that encapsulates a transformation layer that reads the formDSL document template, e.g., over HTTP rest services, or any other data structure that captures the schema in a way that is optimized for rendering online. This minimizes response time and enables running of runtime validations of input data. Accordingly rendering may be implemented using the Generic UI Renderer, a UI library which uses typescript and angular and uses form group and reactive components to manage runtime events. It is extensible to work with other languages as required.

In some embodiments, each template may follow a lifecycle. For example, a new template may start in Draft status and may remain in Draft until the owner of the template submits the template for approval, e.g., to a supervisor of the user, or the user approves the template. In some embodiments, once the template is submitted for approval, it is reviewed by users with appropriate entitlement. In some embodiments, Approvers may use a Preview feature or view the template in a read-only mode for verification. Approvers may decide to approve the template or reject it, e.g., with some comments. If approved, the owner can activate the template and mark it LIVE, e.g., for client distribution, as explained herein. If rejected, the owner may need to fix the template and submit it again for approval. Other actions such as template deletion may also trigger a request for approval, e.g., to ensure that a template is not deleted by mistake without required approvals.

In some embodiments, the output of this process of building a document UI template, then reviewing, editing, and approving the template for distribution, e.g., to a client, may result in an online version of the document that is version controlled and persisted in a datastore for subsequent steps in the workflow, e.g., to create an instance of the document and send it to end users to capture information.

In some embodiments, once the document template is ready to be rendered, e.g., it has been approved and active (in Generic Doc Builder), it is ready to be distributed to the end user. In some embodiments, different modes of operation may be supported. For example, in some embodiments, the processor may instantiate a document for the end user and pass a URL which will allow the end user to access online document using, e.g., a secure channel. In some embodiments, the processor may create an instance of the document on demand, e.g., when a user wants to initiate online transaction, and uses the document underneath to capture inputs of the user.

In some embodiments, an online forms distribution feature may trigger an e-mail or other electronic communication to and end user (e.g., to the client) that contains a Web URL for accessing the online document or content. The distribution process may be configurable in different embodiments. In one example embodiment, a multi-step process may be implemented which includes instantiation of a document, user entitlement setup, web URL generation for the document, audit maintenance, unique reference IDs to manage system handoffs, and work case ID generation to refer to online documents and associated transactions. When pre-initiating a document for an end user, in some embodiments the Web URL may be base64 encoded and may enable the user to directly access the underlying document. In some embodiments, the processor may support subscription-based e-mail support, in which subscribers can access the document only specific number of times.

When a document is distributed to a user, the user may be automatically entitled to that document, as explained herein. In some embodiments, an entitlement model may be implemented which is role based and business entities and documents may be used as the entitled resource to segregate who can see what and to control client/user content using fine grained entitlements. This ensures that only the authorized user can access the document. In some embodiments, when the user clicks on the URL, the user may be directed to a portal where they either login based on existing credentials or create a new account. In some embodiments, a user may choose to delegate form filling, e.g., with other members of their organization and/or have multiple parties collaborate on a document. An example of such a portal is the Morgan Stanley Matrix Portal, which provides 2-factor authentication for a high level of security.

In some embodiments, when a document is distributed, the status of document may initially be NOT YET STARTED. When a user opens the document, the processor may be configured to change the status to MY DRAFT, or some equivalent. In some embodiments, the transition from MY Draft (e.g., when the draft is with the user/client) to REVIEW (e.g., by the document creator or a representative thereof) or PENDING SIGNATURE is triggered only when the user completes the document and submits for review or approval. In some embodiments a user cannot submit the document unless all the mandatory fields are filled. In some embodiments, this may be controlled, e.g., by an isFieldMandatory property of the field. In some embodiments, a document can then be submitted, e.g., for administrative review, which changes the status to REVIEW status. In some embodiments, this may trigger a deficiency workflow, as described herein. Finally, a user can sign the document, e.g., with a digital signature such as Docusign or may choose to sign the document offline and upload the signed document (e.g., a printed PDF with a hard signature).

In some embodiments, Document Distribution may require entitlement setup, e-mail trigger rules, etc. In some embodiments, when a user (e.g., a client) receives an e-mail and clicks the provided URL, first time users may be provided with the ability to create an account. Existing users may be provided a login based on pre-set credentials. For example, one-time password (OTP) based login is supported. In some embodiments, once the client login is successful, a user may be redirected to the document. In some embodiments, the processor may internally execute an online form container application that has multiple angular routes defined which are triggered once the login is successful. Based on the status of document, either a welcome screen or agreement screen route may be triggered. In some embodiments, the welcome screen may be configured to capture document specific information.

In some embodiments, requests and responses between a user/client browser and the web server may be encrypted, e.g., using a Cipher algorithm. The key for this algorithm may be configurable, which ensures that personally identifiable information (PII) and other critical information remains safe, in case of sniffing or other such unauthorized attempts.

In the embodiments, the processor may be configured to provide State Management Configuration. As noted herein, embodiments of the invention support configurable workflow and state management. In some embodiments, workflows are configurable in the database, e.g., without any code change. For example, an Admin may control the workflow by changing parameters in the STATUSDOCMAPPINGS table. Parameters that drive this configuration may be, for example, Current Status, Doc type ID, workflow ID and next status. Based on the current status, doc type ID and workflow ID, the next status may be fetched.

In some embodiments, an Admin may view the document and check audit of the documents but cannot make any change to user inputs. For example, embodiments of the invention may support a read-only mode to ensure that an Admin cannot update any value. In some embodiments, this may be controlled based on entitled actions.

In some embodiments, the processor may be configured to provide deficiency review. It is not uncommon for users/clients to fill in incorrect information in the document, which may be flagged as part of document review by an admin. Resolution may be quite tedious to manage in paper-based or e-mail-based systems. However, in some embodiments, Online Form may support deficiency workflow which streamlines this process. For example, incorrect entries may trigger events that reflect in the document in client browser. The events may be stored in the database, e.g., with the document ID. In some embodiments, the user may be required to click on a Show Deficiency button to view and resolve the issues flagged by the application owner. In some embodiments, issues may be marked as fixed as soon as the user submits the document again for review. In some embodiments, a work case ID, which uniquely identifies a document to the Admin, may be used for triggering deficiency.

In some embodiments, data stored in the database may be used frequently by the application. To optimize performance, in some embodiments, frequently used data may be cached by the processor. In some embodiments, the cache refresh period may be configurable. In some embodiments, the model for storing cached information may vary. Examples of the information that may be cached may include account details, user entitlements, status, etc.

Embodiments of the invention support documents or content that can span over hundreds of pages. Accordingly, space optimization is critical for performance, efficiency, and cost saving. In some embodiments, the processor may be configured to store templates in the database in Binary Large Object (BLOB) format to save data space. A BLOB is a collection of binary data stored as a single entity and is a large object data type in the database system. A BLOB can store a large chunk of data, document types and even media files like audio or video files. BLOB fields allocate space only when the content in the field is utilized.

Figure 7:
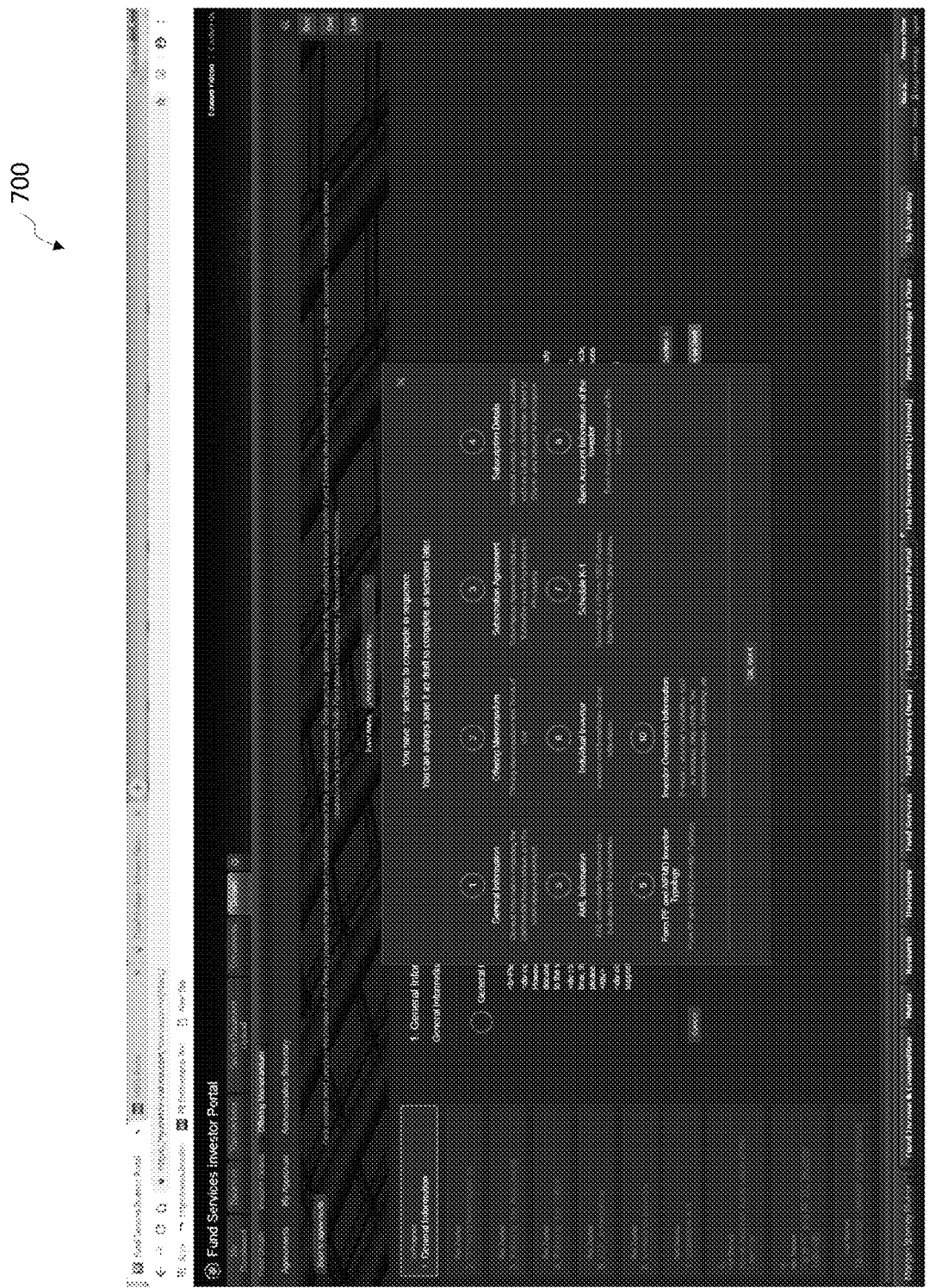
FIG. 7 shows an example portal for accessing the online form according to at least one embodiment of the invention.

In some embodiments, the processor may be configured to receive input from the end user, e.g., via the interactive UI. In some embodiments, the user may access the online form, e.g., via the provided link, and my then enter data as inputs in the various fields. Turning briefly to FIG. 7, an example portal 700 for accessing the online form is shown according to at least one embodiment of the invention. Once accessed, the processor may be configured to extract any input provided in the portal and populate it in the received digital document, e.g., in the original document (or a copy thereof) from which the form was created. In some embodiments, the processor may be configured to implement a user input extraction module. For example, embodiments of the invention may provide an online forms tool which includes logic to parse the template, extract user inputs, and inject them into the equivalent field in the document. In some embodiments, each form field of the template (and/or of rendered online form) may have a unique identifier and a corresponding field in the PDF also has same (or otherwise corresponding) identifier. This enables the processor of the server to populate user inputs into the PDF (e.g., in the digital document). In some embodiments, a PDF population module may use, for example, the PDFBox open-source library to write user inputs in the PDF. In some embodiments, an opt-in feature may be provided to watermark PDF, Word or other format of documents to prevent any handwritten overrides or systematic modification, e.g., when documents are taken outside the online platform. Accordingly, embodiments of the invention enable a digital document to be translated into a UI template, rendered as an online interactive user interface, distributed to users to input data, and converted back into a digital document with the input data populated in the digital document.

Figure 8B:
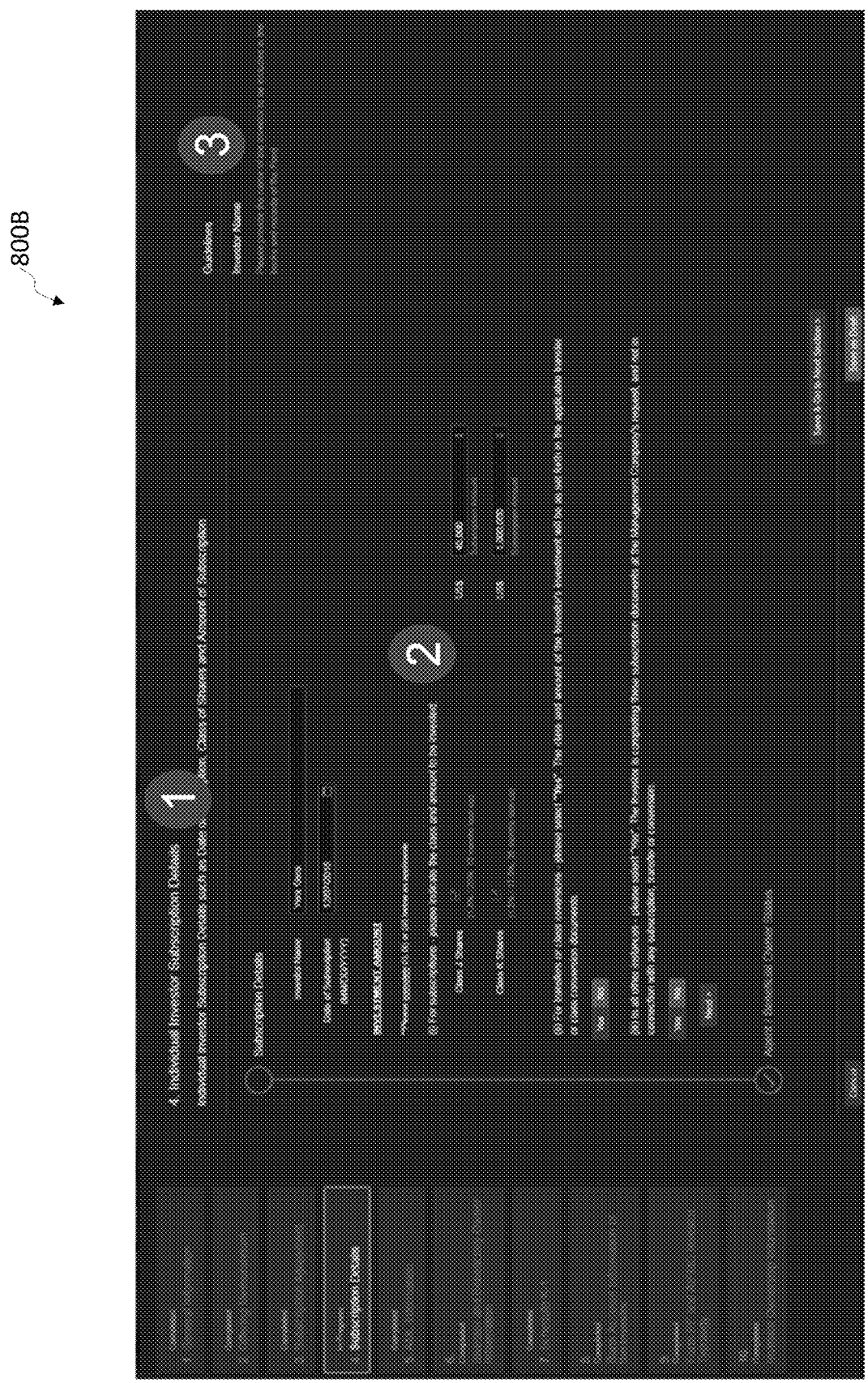

Turning, briefly to FIG. 8A and FIG. 8B, an example digital document portion (800A) and its equivalent interactive user interface (800B), respectively, are shown according to at least one embodiment of the invention. The superimposed reference numbers (1-3) in each of FIG. 8A and FIG. 8B indicate corresponding sections, sub-sections, components, form fields, etc., in the digital document and the interactive user interface.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for translation of a digital document to an equivalent interactive User Interface (UI), comprising:
    receiving, by a processor, the digital document containing content, wherein the digital document is a digital representation of a physical document;
    automatically detecting, by the processor, a placement of a plurality of form fields in the digital document, based at least in part on the content and an organization between the plurality of form fields as defined in a domain specific language;
    constructing, by the processor, a UI template and corresponding object graph, based at least in part on the automatically detected placement of each of the plurality of form fields as defined in the domain specific language;
wherein the UI template represents the content of the digital document according to a predefined document schema, wherein the predefined document schema indicates dependencies between at least two of the plurality of form fields in the digital document, and wherein the predefined schema is defined in the domain specific language; and
wherein the object graph is defined by one or more dependencies and one or more validations associated with the selection and placement of each of the plurality of form fields as defined in the domain specific language;
parsing, by the processor, the UI template; and
rendering, by the processor, the UI template as an interactive UI for distribution to an end user based at least in part on a predefined rendering library as defined in the domain specific language.

2. The method as in claim 1, wherein the content comprises one or more of: structure, input fields, logical grouping of fields, sequence of presentation, predefined dependencies, custom dependencies, data, reference Universal Resource Locator (URL) links, contextual help guidelines, markup, formatting, alignment, header, footer, references, visibility, validation rules, data binding with downstream/upstream systems, event handling, document completion status, and metadata of a document template of the digital document.

3. The method as in claim 1, wherein the selection and placement of the plurality of form fields is via execution of a drag-and-drop function.

4. The method as in claim 1, wherein the predefined document schema comprises a plurality of form elements which follow a hierarchal structure and comprise one or more of each of: a section, a subsection, a component and a field.

5. The method as in claim 1, wherein the plurality of form fields comprises at least one of: a small label, a long label, a date picker, an autocomplete, a textbox, a checkbox, a number, a text area, a checkbox option, a dropdown, or a combination thereof.

6. The method as in claim 5, wherein the combination comprises a predefined widget.

7. The method as in claim 1, further comprising:
storing, by the processor, the UI template in a storage;
managing, by the processor, version control of the UI template; and
governing, by the processor, workflow entitlement of the UI template.

8. The method as in claim 7, further comprising:
querying, by the processor, the storage based on one or more attributes of the UI template; and
enabling access to the UI template by a user based at least in part on at least one of the version control or the workflow entitlement of the UI template.

9. The method as in claim 1, further comprising:
receiving, by the processor, input from the end user, via the interactive UI;
extracting, by the processor, the input; and
populating, by the processor, the input in the received digital document.

10. The method of claim 1 wherein the dependencies are a parent-child.

11. The method of claim 1 wherein the dependencies define an action for at least one of the form fields.

12. A system for translation of a digital document to an equivalent interactive User Interface (UI), comprising:
a computer having a processor, and memory; and
one or more code sets stored in the memory and executing in the processor, which, when executed, configure the processor to:
receive the digital document containing content, wherein the digital document is a digital representation of a physical document;
automatically detect a selection and placement of a plurality of form fields in the digital document, based at least in part on the content and an organization between the plurality of form fields as defined in a domain specific language;
construct a UI template and corresponding object graph, based at least in part on the automatically detected placement of each of the plurality of form fields as defined in a domain specific language;
wherein the UI template represents the content of the digital document according to a predefined document schema wherein the predefined document schema indicates dependencies between at least two of the plurality of form fields in the digital document, and wherein the predefined schema is defined in the domain specific language; and
wherein the object graph is defined by one or more dependencies and one or more validations associated with the selection and placement of each of the plurality of form fields as defined in the domain specific language;
parse the UI template; and
render the UI template as an interactive UI for distribution to an end user based at least in part on a predefined rendering library as defined in the domain specific language.

13. The system as in claim 12, wherein the content comprises one or more of: structure, input fields, logical grouping of fields, sequence of presentation, predefined dependencies, custom dependencies, data, reference Universal Resource Locator (URL) links, contextual help guidelines, markup, formatting, alignment, header, footer, references, visibility, validation rules, data binding with downstream/upstream systems, event handling, document completion status, and metadata of a document template of the digital document.

14. The system as in claim 12, wherein the selection and placement of the plurality of form fields is via execution of a drag-and-drop function.

15. The system as in claim 12, wherein the predefined document schema comprises a plurality of form elements which follow a hierarchal structure and comprise one or more of each of: a section, a subsection, a component and a field.

16. The system as in claim 12, wherein the plurality of form fields comprises at least one of: a small label, a long label, a date picker, an autocomplete, a textbox, a checkbox, a number, a text area, a checkbox option, a dropdown, or a combination thereof.

17. The system as in claim 16, wherein the combination comprises a predefined widget.

18. The system as in claim 12, where in the processor is further configured to:
store the UI template in a storage;
manage version control of the UI template; and
govern workflow entitlement of the UI template.

19. The system as in claim 18, wherein the processor is further configured to:
   query the storage based on one or more attributes of the UI template; and
   enable access to the UI template by a user based at least in part on at least one of the version control or the workflow entitlement of the UI template.

20. The system as in claim 12, wherein the processor is further configured to:
   receive input from the end user, via the interactive UI;
   extract the input; and
   populate the input in the received digital document.

* * * * *